United States Patent
Hayakawa et al.

(10) Patent No.: US 7,526,130 B2
(45) Date of Patent: Apr. 28, 2009

(54) SIGNAL PROCESSING IN BARCODE READING WITH A WAVELET TRANSFORMATION

(75) Inventors: Hiroshi Hayakawa, Saitamai (JP); Susumu Nakano, Hamura (JP); Kentaro Takahashi, Tokoroza (JP)

(73) Assignee: Optoelectronics Co., Ltd., Warabi, Saitama Pref. (JP)

( * ) Notice: Subject to any disclaimer, the term of this patent is extended or adjusted under 35 U.S.C. 154(b) by 463 days.

(21) Appl. No.: 11/253,013

(22) Filed: Oct. 18, 2005

(65) Prior Publication Data

US 2007/0086670 A1   Apr. 19, 2007

(51) Int. Cl.
G06K 9/18   (2006.01)

(52) U.S. Cl. .................. 382/183; 382/260; 382/275; 382/276

(58) Field of Classification Search .......... 382/183, 382/240, 260, 263, 264, 275, 312, 321, 276; 235/435, 426.01
See application file for complete search history.

(56) References Cited

U.S. PATENT DOCUMENTS

| | | | |
|---|---|---|---|
| 4,800,256 A | 1/1989 | Broockman et al. | |
| 5,371,361 A | 12/1994 | Arends et al. | |
| 6,208,951 B1 * | 3/2001 | Kumar et al. | 702/191 |
| 6,219,438 B1 * | 4/2001 | Giordano et al. | 382/110 |
| 6,347,163 B2 * | 2/2002 | Roustaei | 382/324 |
| 6,712,271 B2 | 3/2004 | Bianchi | |
| 2002/0162890 A1 | 11/2002 | Tsi et al. | |
| 2005/0011953 A1 * | 1/2005 | Madej | 235/454 |
| 2005/0133600 A1 | 6/2005 | Lucera et al. | |

FOREIGN PATENT DOCUMENTS

| | | |
|---|---|---|
| JP | 64-41079 | 2/1989 |
| JP | 04-181384 A2 | 6/1992 |
| JP | 7-177099 A | 7/1995 |
| JP | 2000-151290 A | 5/2000 |
| JP | 2000-353940 A | 12/2000 |
| JP | 2001-144552 A | 5/2001 |
| JP | 2001-196877 A | 7/2001 |
| JP | 2002-163601 A | 6/2002 |

OTHER PUBLICATIONS

Int'l Search Report & Written Opin. Feb. 7, 2006.
Int'l Search Report & Written Opin. Jan. 24, 2006.
ISR and Written Opinion Aug. 2, 2006.
International Search Report and Written Opinion for International Application No. PCT/US06/40299.
International Search Report and Written Opinion for International Application No. PCT/US06/40299 , Apr. 4, 2008.

* cited by examiner

*Primary Examiner*—Phuoc Tran
(74) *Attorney, Agent, or Firm*—Kaplan Gilman & Pergament LLP

(57) ABSTRACT

A method for processing a digital signal obtained in a barcode reading operation comprises a step of applying a wavelet transformation to the digital signal. The noise threshold at each level of the wavelet transformation is determined from a total transfer function in the analogue processing stage, and the coefficients are set to be zero if less than the noise threshold.

8 Claims, 2 Drawing Sheets

SIGNAL PROCESSING IN BARCODE READING WITH A WAVELET TRANSFORMATION

BACKGROUND OF THE INVENTION

The present invention relates to signal processing methods in barcode reading techniques, and more particularly, to a method for processing a digital signal obtained in a barcode reading operation in which a wavelet transformation is applied to the digital signal and a noise threshold is determined for each level of the wavelet transformation so as to filter wide band noise.

In a barcode reading operation, a laser light beam is projected from a barcode reader to a barcode, and light reflected from the barcode is received by a detector. An analogue signal is generated from the received reflected light which represents the information encoded in the barcode. After being processed in an analogue processing stage, the analogue signal is converted to a digital signal by an analogue-to-digital (A/D) converter for further processing and decoding. In the digital processing stage, usually one or more band-passing digital filters are used to reject noise in the signal. The similar is true for image based barcode reading such as CCD or CMOS barcode readers.

However, if there is wide band noise such as white noise, the noise in the signal band cannot be rejected by band-passing filters. The white noise may degrade the reading performance when the signal gain is small, e.g., if the barcode is located in a distance, or if the resolving power is low.

Therefore, there exists a need for a better method for processing barcode signals so as to eliminate or reduce wide band noise such as white noise.

SUMMARY OF THE INVENTION

To realize the above object, the present invention provides a method for processing a digital signal obtained in a barcode reading operation, in which a wavelet transformation is applied to the digital signal. Preferably, a threshold is determined for each level of the wavelet coefficients, and the coefficients are set to be zero if lower than the threshold.

Preferably, the digital signal is converted from an analogue signal obtained in the barcode reading operation, and the threshold is a noise threshold determined from information obtained in an analogue processing stage in which the analogue signal is processed before the analogue-to-digital conversion. Preferably, the noise threshold is calculated from a total transfer function $H(\omega)$ in the analogue processing stage:

$$\text{Noise Threshold} = n_0 \sqrt{2 \ln(N)} \times \sqrt{\frac{1}{2\pi} \int_{-\infty}^{\infty} |H(\omega)|^2 d\omega} \quad (1)$$

wherein $n_0$ is resistance thermal noise generated in a preamplifier in the analogue signal processing stage, and N is number of data.

Preferably, the total transfer function $H(\omega)$ is a product of at least one of a transfer function of a differential processing stage $H_{diff}$, a transfer function of an AGC amplification stage $H_{vagc}$, and a transfer function of a frequency filtering stage $H_f$:

$$H(\omega) = H_{diff} \times H_{vagc} \times H_f \quad (2)$$

Preferably, the wavelet transformation is a Haar Wavelet transformation. Preferably, the wavelet transformation is a discrete wavelet transformation.

BRIEF DESCRIPTION OF THE DRAWINGS

The above and other features and advantages will be clearer after reading the detailed description of the preferred embodiments of the present invention with reference to the accompanying drawings, in which.

DETAILED DESCRIPTION OF THE INVENTION

Figure 1:
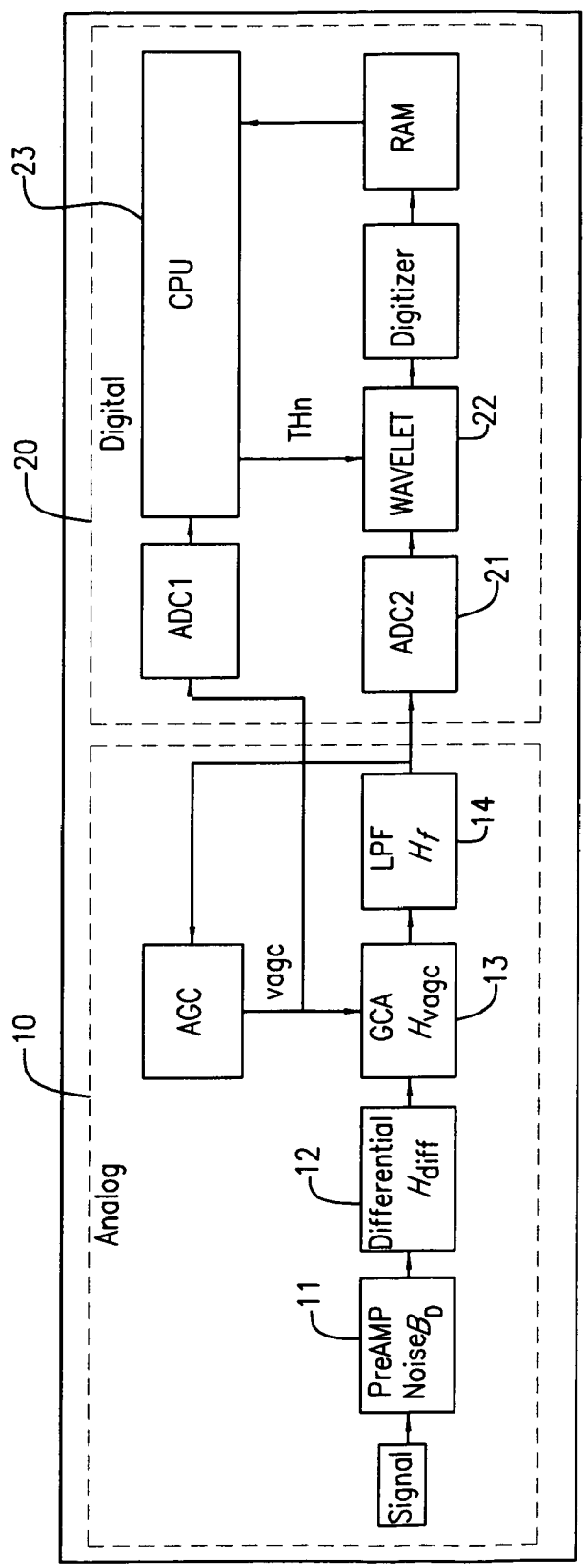
FIG. 1 is a block diagram schematically illustrating signal processing stages implementing signal processing method in a barcode reading operation according to the present invention.

As schematically illustrated in FIG. 1, signal processing in a barcode reading operation usually comprises an analogue processing stage 10 and a digital processing stage 20. The analogue processing stage 10 usually comprises a preamplification stage 11, differential processing stage 12, gain control amplification (GCA) 13, frequency filtering 14, etc. After being processed in the analogue processing stage 10, the analogue signal is converted to a digital signal by an analogue-to-digital (A/D) converter 21, and the converted digital signal is processed with proper algorithms so as to digitally filter noise, to decode the signal, etc.

According to the teachings of the present invention, a wavelet transformation 22 is applied to the digital signal so as to reduce noise, especially wide band noise such as white noise, as explained in more detail below.

A discrete wavelet transformation can be expressed as $$\psi_{j,k}(x) = \frac{1}{\sqrt{2^{-j}}} \psi\left(\frac{x - k2^{-j}}{2^{-j}}\right) = \sqrt{2^j} \psi(2^{j}x - k) \quad (3)$$

The discrete wavelet coefficient is:

$$W[j, k] = \sum_{n=0}^{N-1} f[n]\psi_{j,k}[n] \quad (4)$$

wherein j is called a "level".

Figure 2:
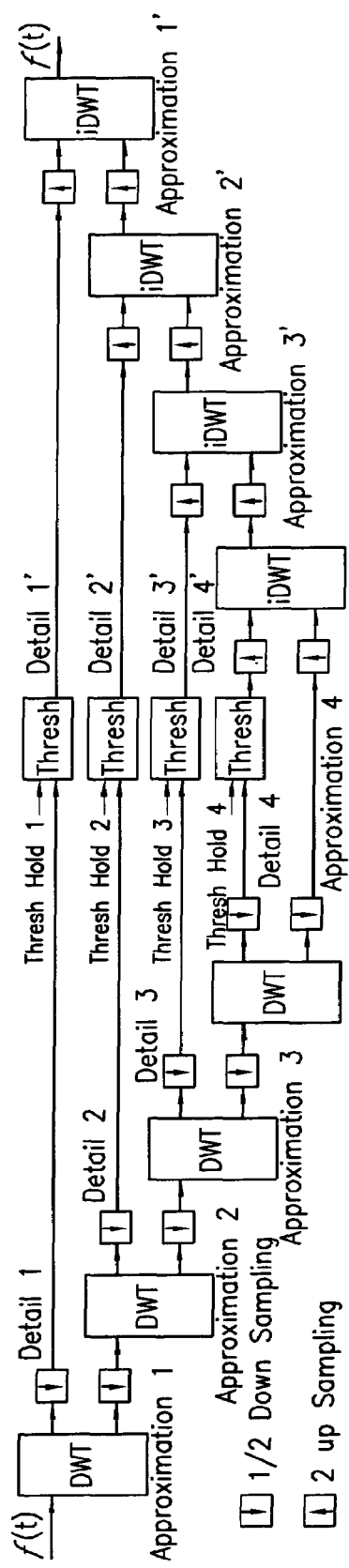
FIG. 2 is a block diagram schematically illustrating wavelet noise filter applied to the digital signal in the signal processing method according to the present invention.

As schematically illustrated in FIG. 2, a signal is decomposed using the wavelet coefficients at every level.

The approximate function $f_j(t)$ at level j is:

$$f_j(t) = \sum_k s_k^{(j)} \varphi_{j,k}(t) \quad (5)$$

wherein s is called a "scale function".

A signal $f_0(t)$ can be expanded as:

$$f_0(t) = f_1(t) + g_1(t) \quad (6)$$

wherein $g_1(t)$ is called "wavelet component" of level 1. $g_1(t)$ can be expressed as:

$$g_1(t) = \sum_k w_k^1 \varphi_{1,k}(t) \quad (7)$$

Thus, the signal $f_0(t)$ can be expanded to level j as follows:

$$f_0(t) = g_1(t) + g_2(t) + \ldots + g_1(t) = \sum_{j=1}^{J} g_j(t) + f_J(t) \quad (8)$$

White noise does not have coherency with the signal. To reduce noise, a noise threshold for each level of the wavelet transformation is properly determined, and the coefficients less than the noise threshold are set to be zero. This can reduce wide band noises including white nose. As long as the noise threshold is larger than zero, it is effectual for noise reduction. However, if the noise threshold is too large, it will make a distortion in the signal.

The noise threshold can be expressed by the following equation:

$$\text{Noise Threshold} = \sigma \sqrt{2\ln(N)} \quad (9)$$

wherein $\sigma$ is standard deviation of noise, and N is number of data.

According to the teaching of the present invention, the standard deviation of noise $\sigma$ is preferably set to be equal to the noise input $n_{in}$ to wavelet transformation, which is calculated as follows:

$$n_{in} = n_0 \sqrt{\frac{1}{2\pi} \int_{-\infty}^{\infty} |H(\omega)|^2 d\omega} \quad (10)$$

wherein $n_0$ is resistance thermal noise in the preamplifier 11 which is usually the origin of major noises, and $H(\omega)$ is a total transfer function between the preamplifier 11 to wavelet transformation 22 in the analogue processing stage.

The resistance thermal noise can be calculated from:

$$n_0 = \sqrt{4kTR_0} \quad (11)$$

wherein k is Boltzmann constant, T is absolute temperature, and $R_0$ is a resistance in the preamplifier 11.

Preferably, the total transfer function $H(\omega)$ is a product of at least one of a transfer function of a differential processing stage $H_{diff}$, a transfer function of an AGC amplification stage $H_{vagc}$, and a transfer function of a frequency filtering stage $H_f$:

$$H(\omega) = H_{diff} \times H_{vagc} \times H_f \quad (2)$$

In the barcode reader system illustrated in FIG. 1, only the transfer function $H_{vagc}$ of the GCA amplification 13 is a variable function, and the transfer functions $H_{diff}$ and $H_f$ are fixed or known functions for calculation by the CPU 23.

Therefore, concluded from the above, the optimum noise threshold is expressed as follows:

$$\text{Noise Threshold} = n_0 \sqrt{2\ln(N)} \times \sqrt{\frac{1}{2\pi} \int_{-\infty}^{\infty} |H(\omega)|^2 d\omega} \quad (1)$$

$$\text{Wherein: } H(\omega) = H_{diff} \times H_{vagc} \times H_f \quad (2)$$

Though the above has described the preferred embodiments of the present invention, it shall be understood that numerous adaptations, modifications and variations are possible to those skilled in the art without departing the gist of the present invention. For example, the wavelet transformation can be a Haar Wavelet transformation or other wavelet transformations. When properly, one or more transfer functions $H_{diff}$, $H_{vagc}$, $H_f$ may be omitted in calculating $H(\omega)$. Therefore, the scope of the present invention is solely intended to be defined by the accompanying claims.

The invention claimed is:

1. A method for processing a digital signal obtained in a barcode reading operation, comprising the steps of applying a wavelet transformation to said digital signal; determining a threshold for coefficients for each level in said wavelet transformation, and setting said coefficients as zero if lower than said threshold wherein said digital signal is obtained by analogue-to-digital conversion of an analogue signal obtained in said barcode reading operation, and said threshold is calculated based on a total transfer function $H(\omega)$ of a analogue processing stage for processing said analogue signal.

2. The method of claim 1, wherein said threshold is calculated by the following equation:

$$\text{Threshold} = n_0 \sqrt{2\ln(N)} \times \sqrt{\frac{1}{2\pi} \int_{-\infty}^{\infty} |H(\omega)|^2 d\omega} \quad (1)$$

wherein $n_0$ is resistance thermal noise generated in a preamplifier in said analogue signal processing stage, and N is number of data.

3. The method of claim 2, wherein said total transfer function $H(\omega)$ is a product of $H_{diff}$, $H_{vagc}$ and $H_f$:

$$H(\omega) = H_{diff} \times H_{vagc} \times H_f \quad (2)$$

wherein $H_{diff}$ is a transfer function of a differential processing stage;

$H_{vagc}$ is a transfer function of an amplification stage by AGC;

$H_f$ is a transfer function of a frequency filtering stage.

4. The method of claim 1, wherein said wavelet transformation is a Haar Wavelet transformation.

5. The method of claim 1, wherein said wavelet transformation is a discrete wavelet transformation.

6. The method of claim 1, wherein said wavelet transformation is a continuous wavelet transformation.

7. A method of reducing white noise from an analogue signal obtained in a barcode reading operation, comprising the steps of:

converting said analogue signal to a digital signal;

applying a wavelet transformation to said digital signal;

determining a noise threshold for each level in said wavelet transformation; and setting all coefficients of said wavelet transformation to be zero if lower than said noise threshold;

wherein said noise threshold is determined based on information obtained in an analogue processing stage for processing said analogue signal;

wherein said noise threshold is calculated based on a total transfer function $H(\omega)$ of said a analogue processing stage:

$$\text{Noise Threshold} = n_0 \sqrt{2\ln(N)} \times \sqrt{\frac{1}{2\pi} \int_{-\infty}^{\infty} |H(\omega)|^2 d\omega} \quad (1)$$

wherein $n_0$ is resistance thermal noise generated in a preamplifier in said analogue signal processing stage, and N is number of data.

8. The method of claim 7, wherein said total transfer function $H(\omega)$ is a product of at least one of a transfer function of a differential processing stage $H_{diff}$, a transfer function of an amplification stage by AGC $H_{vagc}$, and a transfer function of a frequency filtering stage $H_f$:

$$H(\omega) = H_{diff} \times H_{vagc} \times H_f \quad (2)$$

* * * * *